(12) United States Patent
Kerselaers et al.

(10) Patent No.: US 9,941,937 B1
(45) Date of Patent: Apr. 10, 2018

(54) NEAR-FIELD ELECTROMAGNETIC INDUCTION (NFEMI) ANTENNA

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/482,895

(22) Filed: Apr. 10, 2017

(51) Int. Cl.
*H04B 5/00* (2006.01)
*H04B 1/3827* (2015.01)

(52) U.S. Cl.
CPC .......... *H04B 5/0081* (2013.01); *H04B 1/385* (2013.01)

(58) Field of Classification Search
CPC ................................ H04B 5/0081; H04B 5/00
See application file for complete search history.

(56) References Cited

U.S. PATENT DOCUMENTS

| 9,197,986 B1 | 11/2015 | Kerselaers et al. |
| 2014/0218262 A1 | 8/2014 | Tsubaki |
| 2014/0292611 A1* | 10/2014 | Kubo ................ G06K 7/10336 343/867 |
| 2016/0156104 A1* | 6/2016 | Nakano ................ H01Q 1/243 343/702 |
| 2017/0062949 A1 | 3/2017 | Kerselaers et al. |

* cited by examiner

*Primary Examiner* — Tuan H Nguyen

(57) ABSTRACT

Example near-field electromagnetic induction (NFEMI) antenna, including: an electric antenna having a first surface and a second surface; a magnetic antenna having a first, second and third coils; a first feeding connection coupled to one end of the first coil and the first surface; a second feeding connection coupled to another end of the first coil and coupled to one end of the second coil; wherein another end of the second coil is coupled to one end of the third coil; wherein another end of the third coil is coupled to the second surface; wherein the first, second and third coils are configured to carry a time varying current from the first and second feeding connections in a same direction; wherein the first and second coils are configured to have a first coupling coefficient; and wherein the first and third coils are configured to have a second coupling coefficient.

23 Claims, 4 Drawing Sheets

NEAR-FIELD ELECTROMAGNETIC INDUCTION (NFEMI) ANTENNA

The present specification relates to systems, methods, apparatuses, devices, articles of manufacture and instructions an NFEMI antenna.

SUMMARY

According to an example embodiment, a near-field electromagnetic induction (NFEMI) antenna, comprising: an electric antenna including a first electrically conductive surface and a second electrically conductive surface; a magnetic antenna including a first coil, a second coil and a third coil; a first feeding connection coupled to one end of the first coil and the first electrically conductive surface; a second feeding connection coupled to another end of the first coil and coupled to one end of the second coil; wherein another end of the second coil is coupled to one end of the third coil; wherein another end of the third coil is coupled to the second electrically conductive surface; wherein the first, second and third coils are configured to carry a time varying current from the first and second feeding connections in a same direction; wherein the first coil is configured to have a first coupling coefficient with the second coil; and wherein the first coil is configured to have a second coupling coefficient with the third coil.

In another example embodiment, each of the coils are serially coupled.

In another example embodiment, each of the coils have a same winding direction.

In another example embodiment, the first coupling coefficient is greater than the second coupling coefficient.

In another example embodiment, a ratio formed by dividing the second coupling coefficient by the first coupling coefficient is between 0 and 1.

In another example embodiment, the first and second coils are configured as a bifilar wound set of wires; and the third coil is not configured as part of the bifilar wound set of wires.

In another example embodiment, the first and second coils are physically positioned as a set of parallel wires separated by a first distance; the third coil is separated from the set of parallel wires by a second distance; and the second distance is greater than the first distance.

In another example embodiment, at least one of the coils is formed in a shape including: a circle, a square, an oval, or a diamond.

In another example embodiment, the third coil is located inside a circumference formed by the first and second coils.

In another example embodiment, the third coil is located outside a circumference formed by the first and second coils.

In another example embodiment, further comprising a planar substrate; wherein the first coil on one side of the substrate, and the second and third coils are on another side of the substrate.

In another example embodiment, the first, second, and third coils, and the first and second electrically conductive surfaces are formed on the substrate.

In another example embodiment, the substrate includes at least one of: a patch, a medical patch, air, a high dielectric material, or a polyethylene foam.

In another example embodiment, the antenna is embedded in a medical patch configured to be attached to a surface of a living entity; and the patch forms a part of the substrate.

In another example embodiment, the first, second, and third coils, and the first and second electrically conductive surfaces are wrapped around a core.

In another example embodiment, at least one of the electrically conductive surfaces is either: in parallel with the coils, in a center of the coils, or formed by at least one of the coils.

In another example embodiment, the first and second conductive surfaces are electrically open ended.

In another example embodiment, the first and second conductive surfaces are separated by a distance less than a wavelength of a communication frequency of the antenna.

In another example embodiment, the first, second, and third coils are configured to be magnetically coupled to each other, and to generate or respond to a magnetic field; and the electrically conductive surfaces are configured to generate or respond to an electric field.

In another example embodiment, the antenna is configured to operate at a carrier communications frequency below 30 MHz or at about 10.6 MHz.

In another example embodiment, the first and second feeding connections of the antenna are coupled to an electrical apparatus; and the electrical apparatus includes at least one of: a wireless device, a body network, an integrated circuit (IC), an RF IC, a connector port, a circuit element; a tuning circuit, a receiver circuit and/or a transmitter circuit, a radio circuit, a microprocessor, a digital signal processor, an audio amplifier, a data processing unit, a human interface unit, and/or another antenna.

According to an example embodiment, a wearable device comprising: a near-field electromagnetic induction (NFEMI) antenna including, an electric antenna including a first electrically conductive surface and a second electrically conductive surface; a magnetic antenna including a first coil, a second coil and a third coil; a first feeding connection coupled to one end of the first coil and the first electrically conductive surface; a second feeding connection coupled to another end of the first coil and coupled to one end of the second coil; wherein another end of the second coil is coupled to one end of the third coil; wherein another end of the third coil is coupled to the second electrically conductive surface; wherein the first, second and third coils are configured to carry a time varying current from the first and second feeding connections in a same direction; wherein the first coil is configured to have a first coupling coefficient with the second coil; and wherein the first coil is configured to have a second coupling coefficient with the third coil.

In another example embodiment, the wearable device is part of at least one of: a body network, a medical patch, a radio system, a hearing aid, or an earbud.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1A:
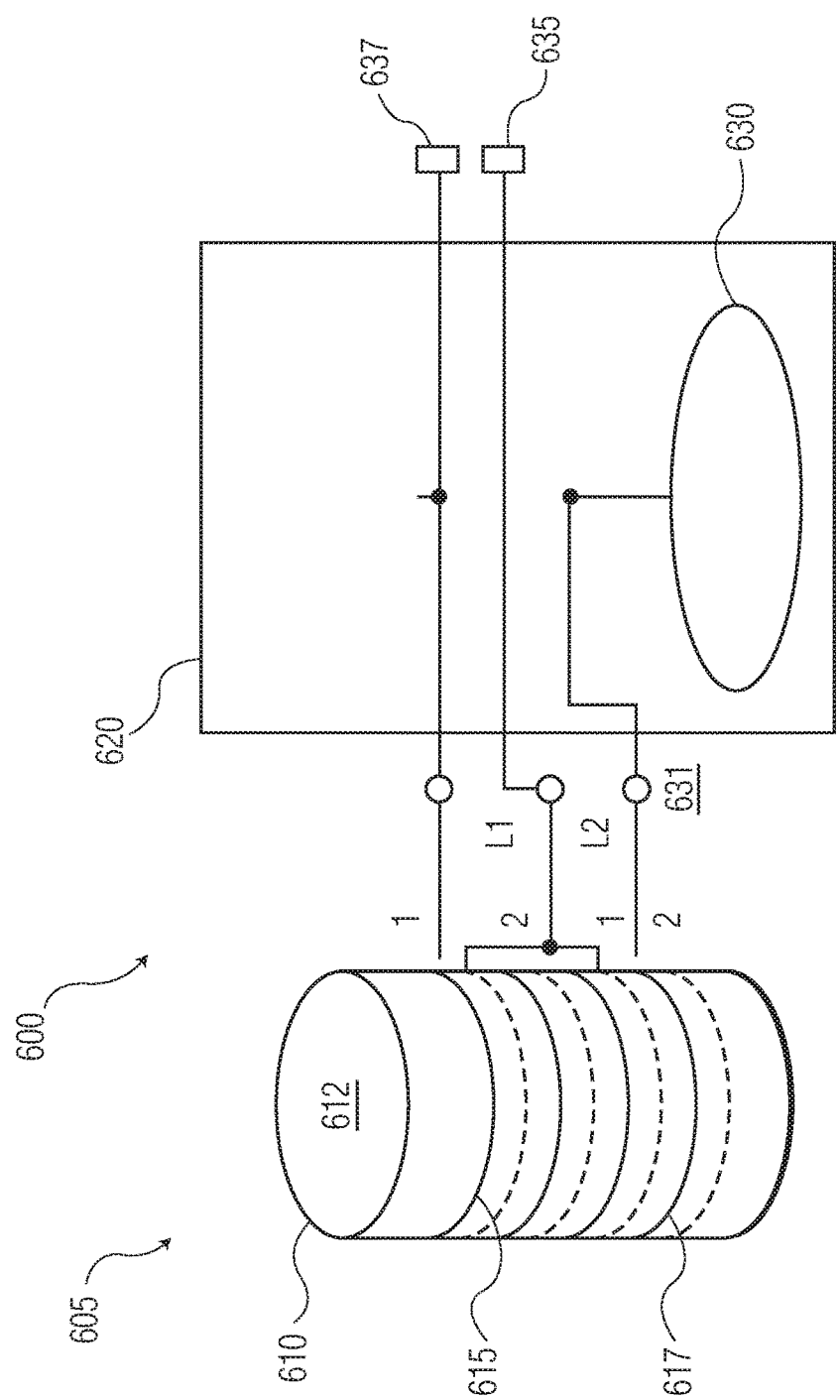
FIG. 1A is an example structural diagram of a first near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Example embodiments of a near-field electromagnetic induction (NFEMI) communication system can operate near a human body by means of a combination of a magnetic field and electric field without the use of transversal radiating waves. Such NFEMI systems improve a wearable device's signal link budget and extend their range to a complete human body.

Whereas RF wireless communication may be accomplished by propagating an RF plane wave through free space, NFEMI communication utilizes non-propagating quasi-static fields. The quasi-static characteristic of the fields is the result of antenna dimensions in combination with the carrier frequency. The majority of the energy is stored in the form of magnetic and electric fields and a small amount of RF energy inevitably propagates in free space.

Small antenna geometries compared with the carrier wavelength are candidate for near field communication since they do not generate radiating waves in free space. Such an antenna can be a coil antenna that allows near field magnetic induction (NFMI). Other antennas communicate by means of both magnetic and electric near fields via near field electromagnetic induction (NFEMI). Such an antenna when in close proximity to the body will generate fields that are confined near the body.

FIG. 1A is an example structural diagram of a first NFEMI antenna 600. The antenna system 600 is a combination of an electrical antenna 620 and a magnetic antenna 605.

The magnetic antenna 605 includes two coupled coils 615 and 617. The first coil 615 has an inductance of L1, and the second coil 617 has an inductance of L2. Both coils 615 and 617 may be connected such that they form a larger inductance compared with the sum of the inductance of the first coil 615 and the second coil 617.

Both coils 615 and 617 may be air coils, form a planar structure, can be wrapped around a ferrite or non-ferrite core 612, or can be wrapped around a magnetic permeable material 610 (e.g. a planar sheet, a ferrite shield, a ferrite sheet or a coating comprising ferrite particles in suspension) which is then wrapped around the core 612. In one example embodiment, the coils 615 and 617 are wrapped around the core 612 in an interleaved fashion. In another example embodiment, the coils 615 and 617 are wrapped on top of one another. In this way, the second coil 617 is first wrapped around the magnetic permeable material 610 and the core 612, and then the first coil 615 is wrapped around the second coil 617, the magnetic permeable material 610 and the core 612.

A first connection of the first coil 615 is connected to a first feeding connection 637. The second connection of the first coil 615 is connected to a first connection of the second coil 617 and to a second feeding connection 635. A second connection of the second coil 617 is connected to an electrically conductive surface 630 within the electric antenna 620.

In close proximity of the body, the antenna 600 will provide fields that are confined near the body. The preferred transmit frequency is below 30 MHz to ensure that the fields are following the body contours and far field radiation is strongly reduced.

Not shown in FIG. 1A, the electrically conductive surface 630 can be wrapped completely, partially or multiply around the coils 615 and 617, any magnetic permeable material 610 and the core 612. In this specification, the phrase "wrapped around" is herein defined to include encircling an object (e.g. core 612) either completely (e.g. by at least 360 angular degrees), partially (e.g. by less than 360 angular degrees) or multiply (e.g. by more than 360 angular degrees, such as several turns of the coils 615 and 617 about the core 612). In some example embodiments, "wrapped around" may only cover, for example, 10 angular degrees about an object such as the core 612.

Note that the core 612 may be of any shape or size. The core 612 may also be at least one of: a non-magnetic metallic core, a battery (e.g. a coin cell battery), or a solid. The core 612 may include various circuitry (e.g. the electrical apparatus referred to herein), and/or other electrical and mechanical parts that may or may not be necessary for functioning of the electrical apparatus or the NFEMI antenna 600.

In some example embodiments, the feeding connections 637 and 635 are connected to an electrical apparatus (not shown). The electrical apparatus embodiments can include: an integrated circuit (IC), an RF IC, a connector port, or other circuit elements. The circuit elements in the electrical apparatus can include: a tuning circuit having capacitive and resistive tuning banks, a receiver circuit and/or a transmitter circuit. In various example embodiments, the electrical apparatus may also include: radio functionality, a microprocessor, a digital signal processor, an audio amplifier, a data processing unit, a human interface unit, and/or another antenna.

Figure 1B:
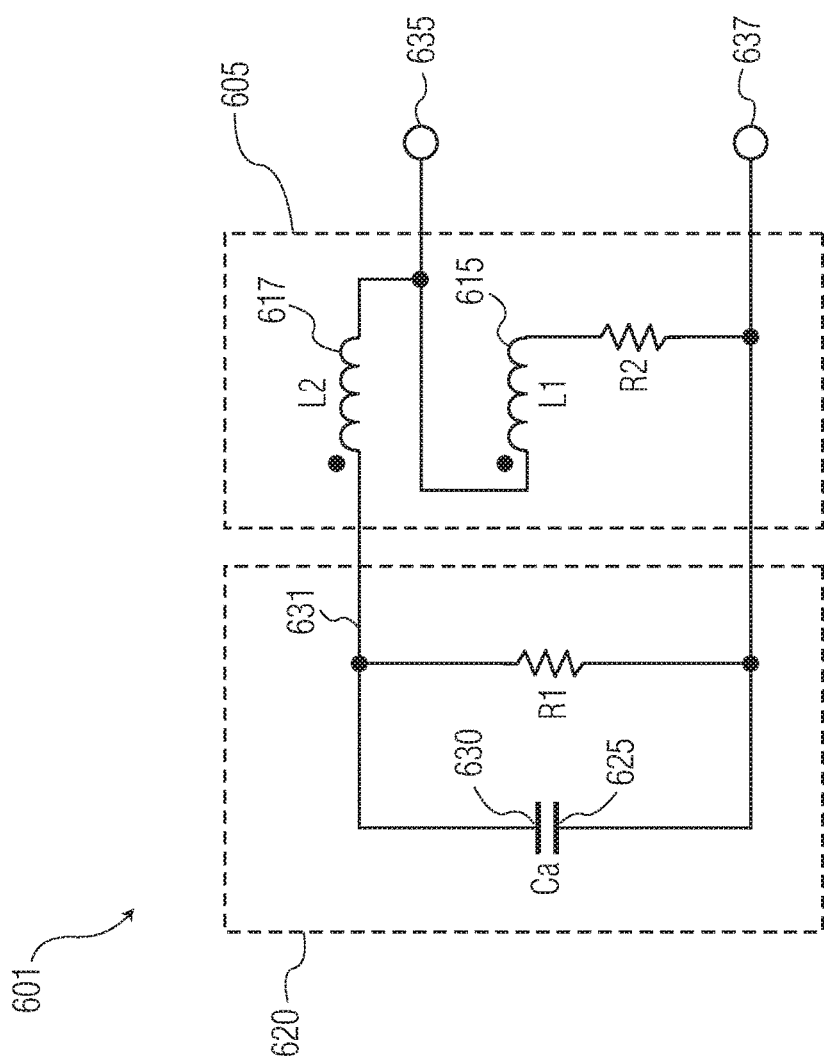
FIG. 1B is an example equivalent electrical circuit for the first NFEMI antenna configured to be connected to an electrical apparatus.

FIG. 1B is an example equivalent electrical circuit 601 for the first NFEMI antenna 600 configured to be connected to an electrical apparatus (not shown). The electrical antenna 620 (e.g. short loaded dipole) is electrically represented by capacitance Ca and resistance R1. The resistance R1 represents the loss of a medium that separates the plates 625 and 630. In one example embodiment, the plates 625 and 630 are separate from the coils 615 and 617, while in another example embodiment at least one of the coils 615 and 617 also functions as at least one of the electrical antenna 620 capacitive plates 625.

The magnetic antenna 605 (e.g. small loop antenna) is electrically represented by at least the two coupled coils 615, 617 of which the first coil 615 has an inductance of L1, and the second coil 617 has an inductance of L2. The resistance R2 represents the loss of the coupled coils.

Now discussed is a second NFEMI antenna that provides an increased magnetic field strength and an increased electric field strength in transmit mode. The received voltage in receive mode is also increased. The second NFEMI antenna's structure can be integrated into very small wireless portable products near to the human body like a smart planar patch, body network devices for healthcare applications, earbuds, hearing aids, and others.

Figure 2A:
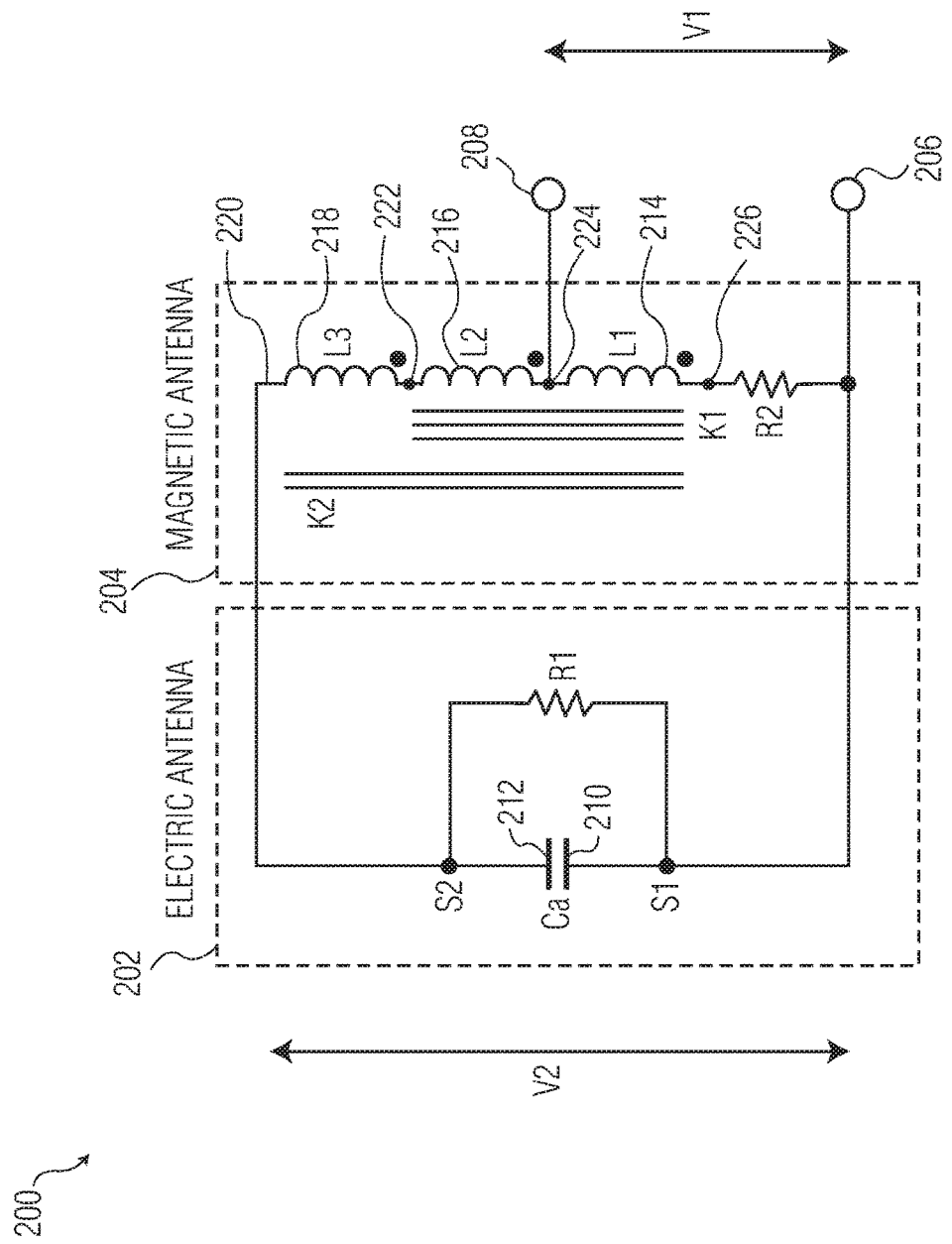
FIG. 2A is an example equivalent electrical circuit for a second NFEMI antenna configured to be connected to an electrical apparatus.

FIG. 2A is an example equivalent electrical circuit for a second NFEMI antenna 200 configured to be connected to an electrical apparatus (not shown). The second NFEMI antenna 200 includes: an electrical antenna 202, a magnetic antenna 204, a first feeding connection 206 (F1), and a second feeding connection 208 (F2).

In various embodiments the antenna 200 is coupled to a substrate (not shown) (e.g. planar sheet, core, etc.) or a core (not shown). In an operational configuration, the antenna 200 is coupled to an electrical apparatus (not shown) (e.g. a wireless device, a body network, an integrated circuit (IC), an RF IC, a connector port, a circuit element; a tuning circuit, a receiver circuit and/or a transmitter circuit, a radio circuit, a microprocessor, a digital signal processor, an audio amplifier, a data processing unit, a human interface unit, and/or another antenna).

Various points 220, 222, 224 and 226 have been added to FIG. 2A for clarity of discussion. These points identify locations in the antenna 200 circuit and may or may not also be locations where there are physical connections of some sort.

The electrical antenna 202 includes a first electrically conductive surface 210 (S1) and a second electrically conductive surface 212 (S2).

The magnetic antenna 204 includes a first coil 214 (L1), a second coil 216 (L2), and a third coil 218 (L3). A first coupling coefficient (K1) is defined between the first coil 214 (L1) and the second coil 216 (L2). A second coupling coefficient (K2) is defined between the first coil 214 (L1) and the third coil 218 (L3).

The first feeding connection 206 is coupled to one end 226 of the first coil 214 and the first electrically conductive surface 210. The second feeding connection 208 is coupled to another end 224 of the first coil 214 and coupled to one end 224 of the second coil 216. Another end 222 of the second coil 216 is coupled to one end 222 of the third coil 218. Another end 220 of the third coil 218 is coupled to the second electrically conductive surface 212.

The first coil 214 (L1), the second coil 216 (L2) and third coil 218 (L3) are each configured to carry a time varying current from the first and second feeding connections in a same direction. See FIG. 2B for an example instantaneous current direction (▶▶▶▶) in the antenna 200.

The first feeding connection 206 (F1) and second feeding connection 208 (F2) are in some example embodiments connected to an electrical apparatus (not shown) (e.g. transceiver, radio system, etc.).

The electric antenna 202 is formed by the first electrically conductive surface 210 (S1) and the second electrically conductive surface 212 (S2) and includes a parasitic resistance R1. The surfaces 210, 212 (S1, S2) are separated and form capacitor Ca at a communication frequency of the antenna 200.

The separation between the two surfaces 210, 212 (S1, S2) in some embodiments is very small compared with a wavelength of the antenna's 200 communication frequency. For example surfaces 210, 212 (S1, S2) may have a separation on the order of 4 mm, compared with the antenna's 200 communication frequency wavelength of 30 meters.

The electric antenna's 202 surfaces 210, 212 (S1, S2) can be placed on either side of a substrate (not shown). The substrate material can be either, or a combination of: a patch, a medical patch, air, a high dielectric material, or a polyethylene foam. R1 represents the loss of a substrate material to which the surfaces 210, 212 are attached.

In other example embodiments, the electric antenna 202 may be formed by combining the first electrically conductive surface 210 (S1) with the second electrically conductive surface 212 (S2) formed from one or more of the magnetic antenna 204 coils 214, 216, 218 (L1, L2, L3).

In one example embodiment, the magnetic antenna 204 is formed by the three planar coils 214, 216, 218 (L1, L2, L3) each having spiral shape. In some example embodiments, the coils 214, 216, 218 (L1, L2, L3) are not completely planar but follow a shape determined by the wireless product in which they are used. The coils 214, 216, 218 (L1, L2, L3) includes a parasitic resistance R2. The resistor R2 represents the loss of the coupled coils 214, 216, 218 (L1, L2, L3).

The coils 214, 216, 218 (L1, L2, L3) are configured to be magnetically coupled to each other during operation and are connected in series with each other and each have a same winding direction.

The first coil 214 is configured to have a first coupling coefficient (K1) with the second coil 216, and the first coil 214 is configured to have a second coupling coefficient (K2) with the third coil 218. The first coil 214 (L1) and the second coil 216 (L2) are physically positioned to create the first coupling coefficient (K1). The third coil 218 (L3) is physically positioned with respect to the first coil 214 to create the second coupling coefficient (K2).

An equation for calculating the first coupling coefficient (K1=coupling coefficient between the first and second coils 214, 216 (L1, L2)) is:

$$K1=(LT-L1-L2)/(2\times(\text{SQRT}(L1\times L2)), \text{ where:}$$

LT=L1+L2+2*M1
L1=inductance of the first coil 214 (L1)
L2=inductance of the second coil 216 (L2)
M1=mutual inductance between coils 214, 216 (L1, L2)

An equation for calculating an example second coupling coefficient (K2=coupling coefficient between the first and third coils 214, 218 (L1, L3)) is:

$$K2=(LT-L1-L3)/(2\times(\text{SQRT}(L1\times L3)), \text{ where:}$$

LT=L1+L3+2*M2
L1=inductance of the first coil 214 (L1)
L3=inductance of the third coil 218 (L3)
M2=mutual inductance between coils 214, 218 (L1, L3)

In certain example embodiments, a ratio between the first and second coupling coefficients (K1, K2) is such that: 0<K2/K1<1. The exact coupling coefficient ratio will vary depending upon the antenna's 200 application (e.g. receiver only, transmitter only, combination receiver-transmitter, etc.).

In various example embodiments, the coupling coefficient between the first coil 214 (L1) and the second coil 216 (L2) (i.e. K1) is 0.5≤K1≤0.95, and the coupling coefficient between L1 and L3 (K2) is 0.1≤K2≤0.5.

In other example embodiments, the antenna 200 a includes bifilar portion 228 and a non-bifilar portion 230. In this example, the bifilar portion 228 includes the first coil 214 (L1) and the second coil 216 (L2) wound like a bifilar coil to create the first coupling coefficient (K1). Bifilar winding is a method where a set of wires are wound besides each other. This leads to a relative high coupling coefficient between the first and second coils 214, 216 (L1, L2).

The non-bifilar portion 230 includes the third coil 218 (L3) which is not bifilar wound with the first and second coils 214, 216 and/or is also kept distant from either or both the first or second coils 214, 216 so as to create the second coupling coefficient (K2), which is weaker (i.e. smaller) than the first coupling coefficient (K1).

The electrical antenna's 202 electrical field is dependent on a voltage (V2) across capacitor Ca formed by the two conductive surfaces 210, 212 (S1, S2). Since the electric antenna 202 represents a high impedance, the coupled coils 214, 216, 218 (L1, L2, L3) loaded at point 220 have a voltage transfer function of:

$$V_{gain} = V2/V1$$

$$V_{gain} = 1 + (K1 \times SQRT(L2/L1)) + (K2 \times SQRT(L3/L1))$$

Thus a signal from a transmitter source coupled to the first and second feeding connections (F1, F2) is amplified and over unity on the capacitor Ca. For example for a planar set of coils 214, 216, 218 (L1, L2, L3), with L1=7 turns, L2=7 turns, L3=10 turns (more L3 turns since diameter of turns is smaller (i.e. it's in the center of L1 & L2 coils)) and a surface area of 22×22 mm, when Ca is 10 pF, and the Ca impedance at 10 MHz is 1.5 kohms, a voltage gain of 2.56 has been measured.

In certain embodiments a parasitic capacitance between the first coil 214 (L1) and the second coil 216 (L2) needs to be reduced such that the parasitic capacitance does not reduce V2 between the first electrically conductive surface 210 (S1) and the second electrically conductive surface 212 (S2) and thus interfere with the electrical antenna 202 signals. One way to reduce the parasitic capacitance is to place the first coil 214 (L1) and the second coil 216 (L2) on either side of a substrate (not shown).

In other example embodiments, the coils 214, 216, 218 (L1, L2, L3) can be wrapped around an object (e.g. a core) and have a variety of shapes (e.g. circular, square, etc.).

In example embodiments where the electrical apparatus coupled to the antenna's 200 feeding connections 206, 208 (F1, F2) is a radio system, the radio system may contain a variable capacitor to resonate the second NFEMI antenna 200 at a communication frequency (e.g. below 30 MHz and/or about 10.6 MHz). The radio systems may also contain a variable resistor to define the bandwidth of the antenna suitable for the modulated communication signal.

In example embodiments where the electrical apparatus is a transceiver, in a receive mode the feeding connections 206, 208 and a tuning system may be further connected to a low noise amplifier, LNA, and other baseband functions. In a transmit mode the feeding connections 206, 208 are connected to a modulated signal source.

Figure 2B:
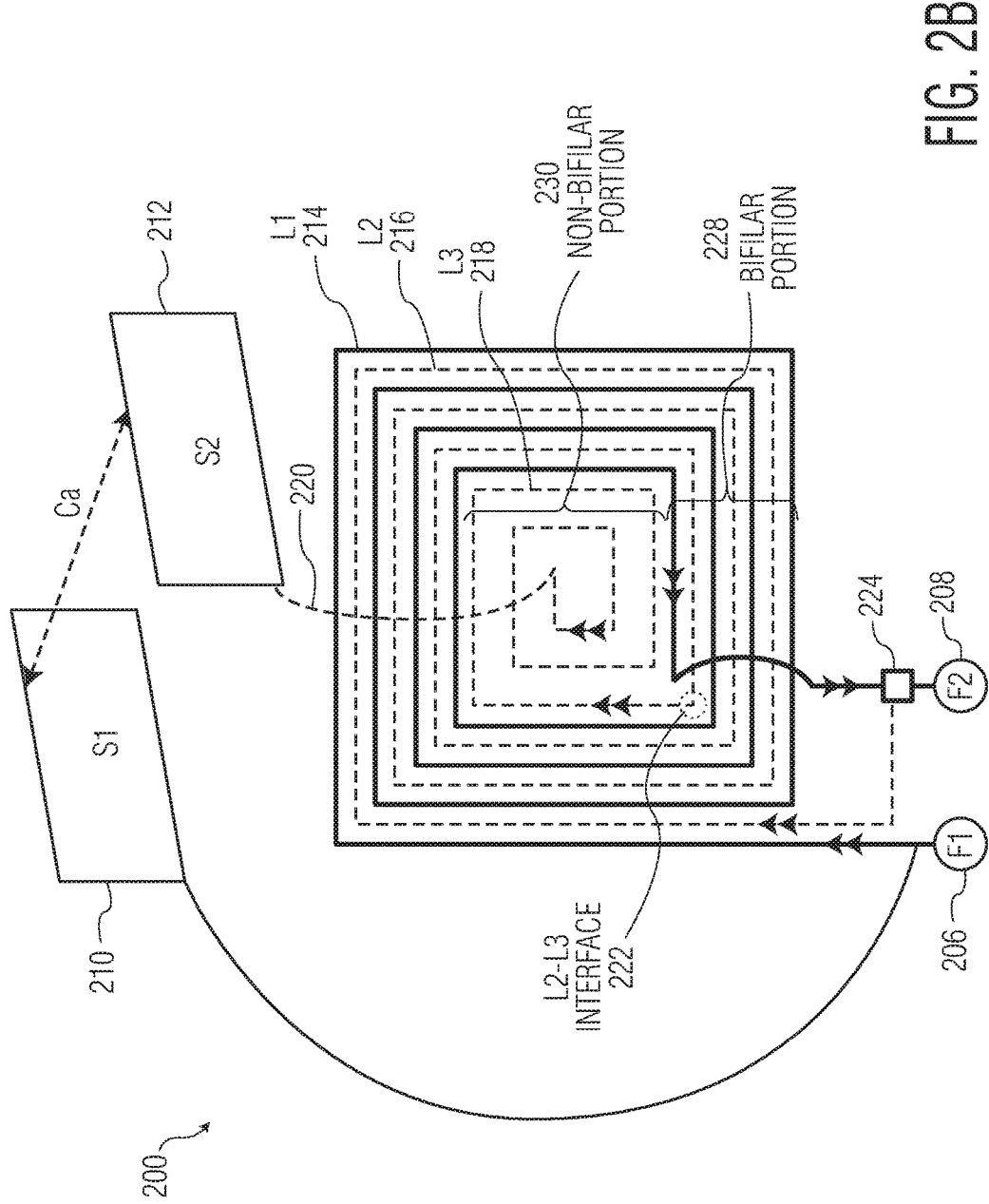
FIG. 2B is an example structural diagram of the second NFEMI antenna.

FIG. 2B is an example structural diagram of the second NFEMI antenna 200. In this example, the third coil 218 (L3) is wound on a planar substrate inside of the first coil 214 (L1) and the second coil 216 (L2).

In an alternate embodiment, the third coil 218 (L3) could be placed on the planar surface on outside of the first coil 214 (L1) and the second coil 216 (L2).

The antenna 200 discussed above improves reliability for wireless communications in applications such as consumer lifestyle and healthcare. The antenna 200 provides an improved communication link, at least in part by generating stronger electrical and magnetic fields in a wireless transmit mode and a higher voltage in a wireless receive mode.

In those example embodiments where the antenna is embedded within a patch, the patch can be configured to be attached to a surface of a living entity (e.g. the human body) for effecting functions such as, monitoring a person's vital signs, or for dispensing medicine or other therapies.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field electromagnetic induction (NFEMI) antenna, comprising:
   an electric antenna including a first electrically conductive surface and a second electrically conductive surface;
   a magnetic antenna including a first coil, a second coil and a third coil;
   a first feeding connection coupled to one end of the first coil and the first electrically conductive surface;
   a second feeding connection coupled to another end of the first coil and coupled to one end of the second coil;
   wherein another end of the second coil is coupled to one end of the third coil;
   wherein another end of the third coil is coupled to the second electrically conductive surface;
   wherein the first, second and third coils are configured to carry a time varying current from the first and second feeding connections in a same direction;
   wherein the first coil is configured to have a first coupling coefficient with the second coil; and
   wherein the first coil is configured to have a second coupling coefficient with the third coil.

2. The antenna of claim 1:
   wherein each of the coils are serially coupled.

3. The antenna of claim 1:
   wherein each of the coils have a same winding direction.

4. The antenna of claim 1:
wherein the first coupling coefficient is greater than the second coupling coefficient.

5. The antenna of claim 1:
wherein a ratio formed by dividing the second coupling coefficient by the first coupling coefficient is between 0 and 1.

6. The antenna of claim 1:
wherein the first and second coils are configured as a bifilar wound set of wires; and
wherein the third coil is not configured as part of the bifilar wound set of wires.

7. The antenna of claim 1:
wherein the first and second coils are physically positioned as a set of parallel wires separated by a first distance;
wherein the third coil is separated from the set of parallel wires by a second distance; and
wherein the second distance is greater than the first distance.

8. The antenna of claim 1:
wherein at least one of the coils is formed in a shape including: a circle, a square, an oval, or a diamond.

9. The antenna of claim 1:
wherein the third coil is located inside a circumference formed by the first and second coils.

10. The antenna of claim 1:
wherein the third coil is located outside a circumference formed by the first and second coils.

11. The antenna of claim 1:
further comprising a planar substrate;
wherein the first coil is on one side of the substrate, and the second and third coils are on another side of the substrate.

12. The antenna of claim 11:
wherein the first, second, and third coils, and the first and second electrically conductive surfaces are formed on the substrate.

13. The antenna of claim 11:
wherein the substrate includes at least one of: a patch, a medical patch, air, a high dielectric material, or a polyethylene foam.

14. The antenna of claim 11:
wherein the antenna is embedded in a medical patch configured to be attached to a surface of a living entity; and
wherein the patch forms a part of the substrate.

15. The antenna of claim 1:
wherein the first, second, and third coils, and the first and second electrically conductive surfaces are wrapped around a core.

16. The antenna of claim 1:
wherein at least one of the electrically conductive surfaces is either: in parallel with the coils, in a center of the coils, or formed by at least one of the coils.

17. The antenna of claim 1:
wherein the first and second conductive surfaces are electrically open ended.

18. The antenna of claim 1:
wherein the first and second conductive surfaces are separated by a distance less than a wavelength of a communication frequency of the antenna.

19. The antenna of claim 1:
wherein the first, second, and third coils are configured to be magnetically coupled to each other, and to generate or respond to a magnetic field; and
wherein the electrically conductive surfaces are configured to generate or respond to an electric field.

20. The antenna of claim 1:
wherein the antenna is configured to operate at a carrier communications frequency below 30 MHz or at about 10.6 MHz.

21. The antenna of claim 1:
wherein the first and second feeding connections of the antenna are coupled to an electrical apparatus; and
wherein the electrical apparatus includes at least one of:
a wireless device, a body network, an integrated circuit (IC), an RF IC, a connector port, a circuit element; a tuning circuit, a receiver circuit and/or a transmitter circuit, a radio circuit, a microprocessor, a digital signal processor, an audio amplifier, a data processing unit, a human interface unit, and/or another antenna.

22. A wearable device comprising:
a near-field electromagnetic induction (NFEMI) antenna including,
an electric antenna including a first electrically conductive surface and a second electrically conductive surface;
a magnetic antenna including a first coil, a second coil and a third coil;
a first feeding connection coupled to one end of the first coil and the first electrically conductive surface;
a second feeding connection coupled to another end of the first coil and coupled to one end of the second coil;
wherein another end of the second coil is coupled to one end of the third coil;
wherein another end of the third coil is coupled to the second electrically conductive surface;
wherein the first, second and third coils are configured to carry a time varying current from the first and second feeding connections in a same direction;
wherein the first coil is configured to have a first coupling coefficient with the second coil; and
wherein the first coil is configured to have a second coupling coefficient with the third coil.

23. The wearable device of claim 22:
wherein the wearable device is part of at least one of: a body network, a medical patch, a radio system, a hearing aid, or an earbud.

* * * * *